US010558076B2

(12) United States Patent
Zhao et al.

(10) Patent No.: US 10,558,076 B2
(45) Date of Patent: Feb. 11, 2020

(54) LIQUID CRYSTAL LENS PANEL FOR DISPLAY DEVICE AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Wenqing Zhao, Beijing (CN); Xue Dong, Beijing (CN); Xiaochuan Chen, Beijing (CN); Jian Gao, Beijing (CN); Qian Wang, Beijing (CN); Ming Yang, Beijing (CN); Pengcheng Lu, Beijing (CN); Rui Xu, Beijing (CN); Lei Wang, Beijing (CN); Xiaochen Niu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 38 days.

(21) Appl. No.: 15/537,737

(22) PCT Filed: Nov. 11, 2016

(86) PCT No.: PCT/CN2016/105491
§ 371 (c)(1),
(2) Date: Jun. 19, 2017

(87) PCT Pub. No.: WO2017/118216
PCT Pub. Date: Jul. 13, 2017

(65) Prior Publication Data
US 2018/0046002 A1    Feb. 15, 2018

(30) Foreign Application Priority Data

Jan. 8, 2016    (CN) .......................... 2016 1 0012276

(51) Int. Cl.
*G02F 1/1335*    (2006.01)
*G02F 1/29*    (2006.01)

(52) U.S. Cl.
CPC .......... *G02F 1/133526* (2013.01); *G02F 1/29* (2013.01)

(58) Field of Classification Search
CPC combination set(s) only.
See application file for complete search history.

(56) References Cited

U.S. PATENT DOCUMENTS

2002/0145701 A1* 10/2002 Sun .................. G02F 1/134309
349/200
2009/0109154 A1    4/2009 Hong et al.
(Continued)

FOREIGN PATENT DOCUMENTS

CN    101419351 A    4/2009
CN    101561570 A    10/2009
(Continued)

OTHER PUBLICATIONS

ISR and WO dated Feb. 15, 2017; PCT/CN2016/105491.
(Continued)

*Primary Examiner* — Lauren Nguyen
(74) *Attorney, Agent, or Firm* — Ladas & Parry LLP

(57) ABSTRACT

A liquid crystal lens panel and a display device, and the liquid crystal lens panel includes a first substrate, a second substrate opposite to the first substrate, and a liquid crystal layer between the first substrate and the second substrate, the liquid crystal lens panel further includes a first electrode and a second electrode, the first electrode is provided on the first substrate, the second electrode is provided on the first substrate or the second substrate, the second electrode includes a plurality of electrode units arranged in an array, and each of the plurality of electrode units and the first
(Continued)

electrode are configured to form an electric field therebetween, so as to drive the liquid crystal layer to form an equivalent lens unit.

10 Claims, 4 Drawing Sheets

(56) References Cited

U.S. PATENT DOCUMENTS

| | | | | |
|---|---|---|---|---|
| 2009/0262298 A1* | 10/2009 | Chen | ..................... | G02F 1/13 |
| | | | | 349/200 |
| 2013/0135545 A1* | 5/2013 | Jung | ................ | G02F 1/13306 |
| | | | | 349/33 |

FOREIGN PATENT DOCUMENTS

| | | | |
|---|---|---|---|
| CN | 102279491 | A | 12/2011 |
| CN | 204129391 | U | 1/2015 |
| CN | 104570520 | A | 4/2015 |
| CN | 105446028 | A | 3/2016 |
| JP | 2009-157145 | A | 7/2009 |
| JP | 2014-215441 | A | 11/2014 |

OTHER PUBLICATIONS

The First Chinese Office Action dated Dec. 15, 2017; Appln. No. 201610012276.0.
The Second Chinese Office Action dated Jun. 29, 2018; Appln. No, 20161002276.0.

* cited by examiner

LIQUID CRYSTAL LENS PANEL FOR DISPLAY DEVICE AND DISPLAY DEVICE

TECHNICAL FIELD

Embodiments of the present disclosure relate to a liquid crystal lens panel and a display device.

BACKGROUND

At present, a common display device is generally a thin film transistor liquid crystal display (TFT-LCD) or an organic light-emitting diode (OLED) display, the light emitted by such a display device forms a light field emitting in a manner of a sphere, and thus the display device has a relatively large light-emitting spherical angle in space.

However, because display devices have a relatively large light-emitting spherical angle in space, the light energy received by a human eye accounts for a very small part, and thus the utility rate of the light energy is relatively low. In recent years, with the fast development of all kinds of display devices, how to increase the utility rate of the light energy is paid more attention by people.

SUMMARY

At least one embodiment of the present disclosure provides a liquid crystal lens panel which includes a first substrate, a second substrate opposite to the first substrate, and a liquid crystal layer between the first substrate and the second substrate; and the liquid crystal lens panel further includes a first electrode and a second electrode, the first electrode is provided on the first substrate, the second electrode is provided on the first substrate or the second substrate, the second electrode includes a plurality of electrode units arranged in an array, and the electrode units and the first electrode are configured to form electric fields therebetween, so as to drive the liquid crystal layer to form equivalent lens units.

The plurality of equivalent lens units of the liquid crystal lens panel can adjust the direction of collimated light, so as to reduce the unnecessary waste of light energy and improve the light utility rate. Furthermore, the liquid crystal lens panel can also be used in situations such as an anti-peeping display, a holography display or a glasses-free 3D display, and this broadens the application scope of the display device.

At least one embodiment of the present disclosure provides a display device which includes a display module and the above liquid crystal lens panel, the liquid crystal lens panel is on a light-emitting side of the display module; and the equivalent lens unit of the liquid crystal lens panel is configured to adjust a direction of emergent light of the display module.

In the technical solution of the embodiment of the present disclosure, the display module is configured to give out collimated light, the plurality of the equivalent lens units of the liquid crystal lens panel is configured to adjust the direction of collimated light, the light-emitting direction of the display device can be controlled according to the application situation of the display device, thus the unnecessary waste of light energy is reduced and the light utility rate is improved. Furthermore, the display device can also be used in situations such as an anti-peeping display, a holography display or a glasses-free 3D display, and this broadens the application scope of the display device.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
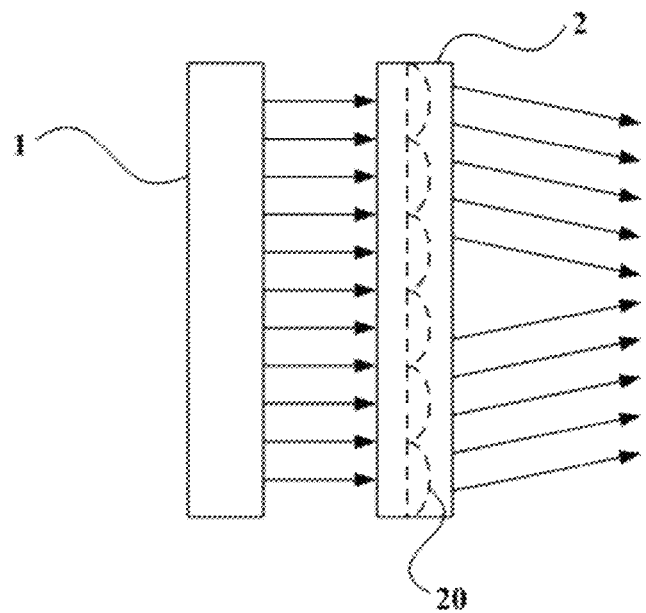
FIG. 1 is a schematic view of the display device according to a first embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

At least one embodiment of the present disclosure provides a liquid crystal lens panel which includes a first substrate, a second substrate opposite to the first substrate, and a liquid crystal layer between the first substrate and the second substrate; and the liquid crystal lens panel further includes a first electrode and a second electrode, the first electrode is on the first substrate, the second electrode is on the first substrate or the second substrate, the second electrode includes a plurality of electrode units arranged in an array, and the first electrode and each of the plurality of the electrode units are configured to form an electric field therebetween, so as to drive the liquid crystal layer to form an equivalent lens unit (namely a unit equivalent to a lens).

In an embodiment of the present disclosure, each of the electrode units includes at least two ring-shaped electrodes arranged in a radial manner. The ring-shaped electrodes arranged in a radial manner refer to that the ring-shaped electrodes have a same center but are of different sizes and are arranged around the same center.

In the case that such a structural design is adopted, the position of the equivalent lens unit of the liquid crystal lens panel is unadjustable, while the focus of the equivalent lens unit is adjusted via adjusting the voltage of the ring-shaped electrodes in the electrode unit.

In an embodiment of the present disclosure, the ring-shaped electrodes comprise closed ring-shaped electrodes or ring-shaped electrodes with discontinuous points.

In an embodiment of the present disclosure, the ring-shaped electrodes comprise circular ring-shaped electrodes, quadrate ring-shaped electrodes or triangular ring-shaped electrodes.

It should be understood that, the shapes of the ring-shaped electrodes are not limited to the circular, quadrate or triangular shapes, or can also have pentagonal or hexagonal shapes, and so on.

In the case that the ring-shaped electrodes are circular ring-shaped electrodes, the equivalent lens unit can be regarded as an equivalent spherical lens. In the case that the ring-shaped electrodes are quadrate ring-shaped electrodes or triangular ring-shaped electrodes, the equivalent lens unit can be regarded as an equivalent pyramid lens.

In an embodiment of the present disclosure, each electrode unit includes a plurality of dot-matrix electrodes.

By adoption of such a structure design, the position of the equivalent lens unit of the liquid crystal lens panel can be adjusted, and the position and the focus of the equivalent lens unit can be adjusted via adjusting the voltages of the dot-matrix electrodes.

In an embodiment of the present disclosure, the dot-matrix electrodes comprise circular dot-matrix electrodes, quadrate dot-matrix electrodes or triangular dot-matrix electrodes.

The plurality of equivalent lens units of the liquid crystal lens panel can adjust the direction of collimated light, so as to reduce the unnecessary waste of light energy and improve the light utility rate. Furthermore, the liquid crystal lens panel can also be used in situations such as an anti-peeping display, a holography display or a glasses-free 3D display, and this broadens the application scope of a display device.

At least one embodiment of the present disclosure provides a display device which includes a display module and the liquid crystal lens panel as stated in any one of the above embodiments, and the liquid crystal lens panel is on a light-emitting side of the display module. In the display device, the display module is configured to emit collimated light; and the equivalent lens unit of the liquid crystal lens panel is configured to adjust a direction of the collimated light.

In the technical solution of the embodiment of the present disclosure, the display module emits the collimated light, the plurality of the equivalent lens units of the liquid crystal lens panel is configured to adjust the direction of the collimated light, and the light-emitting direction of the display device can be controlled according to the application situation of the display device, so as to reduce the unnecessary waste of light energy and to improve the light utility rate. Furthermore, the liquid crystal lens panel can also be used in situations such as an anti-peeping display, a holography display or a glasses-free 3D display, and this broadens the application scope of the display device.

In an embodiment of the present disclosure, the display module includes a backlight module, a liquid crystal panel, and a light collimation correction device. In the display module, the liquid crystal panel is on the light-emitting side of the backlight module; and the light collimation correction device is provided between the backlight module and the liquid crystal panel, or the light collimation correction device is provided on the light-emitting side of the liquid crystal panel.

In an embodiment of the present disclosure, the display module includes an organic light-emitting diode display panel and a light collimation correction device; and in the display module, the light collimation correction device is provided on the light-emitting side of the organic light-emitting diode display panel.

In an embodiment of the present disclosure, the light collimation correction device comprises a brightness enhancement film.

In an embodiment of the present disclosure, a plurality of pixel portions, positions of which are opposite to the equivalent lens unit, of the display module is configured to be selectively turned off. In this way, not only the light energy can be saved, but also the realization of the accurate control of the emergent light of the display device is facilitated, and thus the display quality is improved.

In an embodiment of the present disclosure, the display device comprises an anti-peeping display device, a glasses-free 3D display device, a holography display device or a partial light enhancement display device. In this way, the display device has a rich application field and a wide application scope.

As illustrated in FIG. 1, at least one embodiment of the present disclosure provides a display device which includes a display module 1 and a liquid crystal lens panel 2 on a light-emitting side of the display module 1, the display module 1 is configured to emit collimated light, the liquid crystal lens panel 2 includes a plurality of equivalent lens units 20 arranged in an array, and the equivalent lens units 20 are configured to adjust the direction of the collimated light, namely to be able to adjust the collimated light to the light along the adjusted direction in a three-dimensional system of coordinate.

In the embodiment of the present disclosure, the "light-emitting side" of a certain component can be understood as the side, close to a viewer, of the component in the case that the display device is normally used.

It should be understood that, the collimated light mentioned in the embodiment of the present disclosure is not limited to be absolutely perpendicular to the screen of the display device, but a certain error range is allowable. For example, the angle between the collimated light emitted by the display module 1 and the screen is $90°\pm\alpha$, and $\alpha$ is a selected angle tolerance.

In the technical solution of the embodiment of the present disclosure, the display module 1 is configured to emit the collimated light, the plurality of the equivalent lens units 20 of the liquid crystal lens panel 2 is configured to adjust the direction of the collimated light, and the light-emitting direction of the display device can be controlled according to the application situation of the display device, so as to reduce the unnecessary waste of light energy, and to improve the light utility rate. Furthermore, the display device can also be used in situations such as an anti-peeping display, a holography display or a glasses-free 3D display, and this greatly enriches the application range of the display device.

The specific type of the display device is not limited. For example, the display device can be a 2D display device, an anti-peeping display device, a glasses-free 3D display device, a holography display device, or a display device which requires a partial light enhancement, and so on. For example, in the case that the display device is a glasses-free 3D display device, the collimated light is modulated by the columns of the equivalent lens units into the light orientated to the left-eye viewing region and the light orientated to the right-eye viewing region of a viewer, so as to realize glasses-free 3D display effect. For another example, in the case that the display device is the anti-peeping display device, the collimated light has a small viewing angle after the modulation of the equivalent lens units, in this way, only the viewer right in front of the screen is able to view the picture display and the viewer at other positions is not able to view the picture display.

In the above embodiment of the present disclosure, the type of the display module 1 is not limited, and for example, the display device can be a liquid crystal display module.

Figure 2:
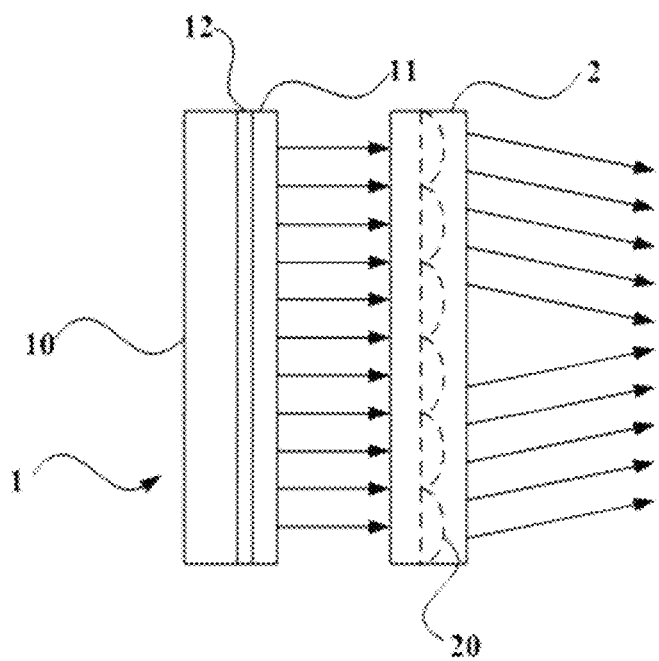
FIG. 2 is a schematic view of the display device according to a second embodiment of the present disclosure.

As illustrated in FIG. 2, the structure of the liquid crystal display module can include a backlight module 10, a liquid crystal panel 11 and a light collimation correction device 12, the liquid crystal panel 11 is on the light-emitting side of the backlight module 10, and the light collimation correction device 12 is provided between the backlight module 10 and the liquid crystal panel 11. The backlight module 10 is configured to provide a spherical light field, and the light collimation correction device 12 is configured to modulate the divergent light emitted by the backlight module 10 into collimated light, so that the light is incident to the liquid crystal panel 11 vertically.

Figure 3:
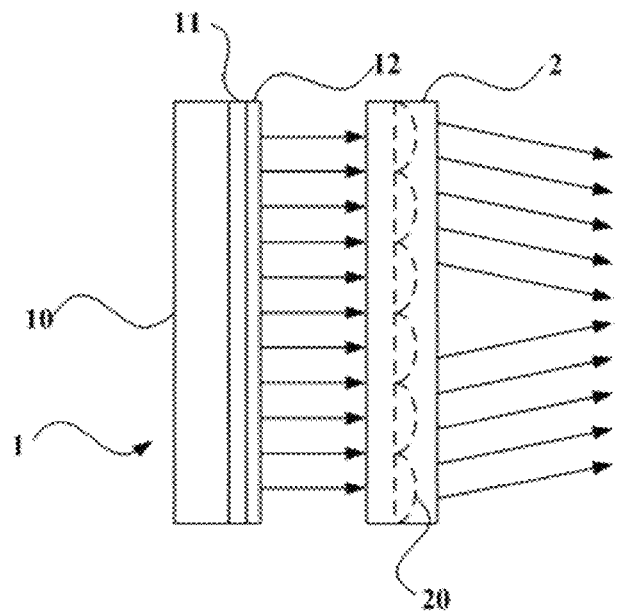
FIG. 3 is a schematic view of the display device according to a third embodiment of the present disclosure.

As illustrated in FIG. 3, the structure of the liquid crystal display module can further include a backlight module 10, a liquid crystal panel 11, and a light collimation correction device 12; the liquid crystal panel 11 is provided on the light-emitting side of the backlight module 10, and the light collimation correction device 12 is provided on the light-emitting side of the liquid crystal panel 11. The divergent light emitted by the backlight module 10 is still divergent light after passing through the liquid crystal panel 11, and the light collimation correction device 12 modulates the light emitted by the liquid crystal panel 11 into collimated light, so that the light travels forward and is perpendicular to the liquid crystal panel 11.

Figure 4:
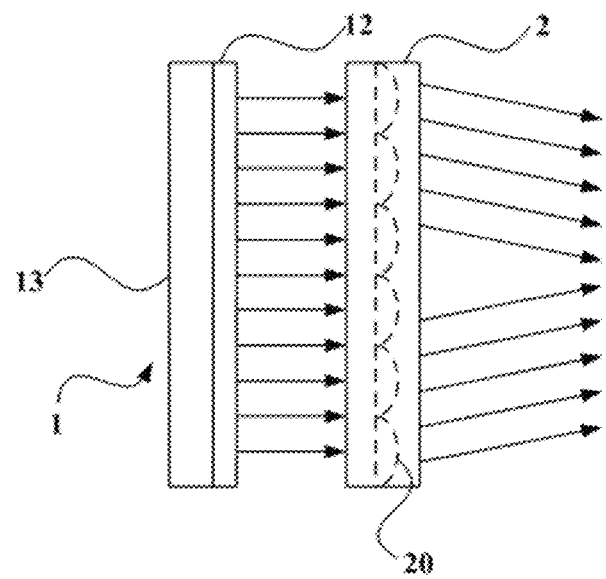
FIG. 4 is a schematic view of the display device according to a fourth embodiment of the present disclosure.

As illustrated in FIG. 4, the display module 1 can also be an organic light-emitting diode display module, and include an organic light-emitting diode display panel 13 and a light collimation correction device 12, and the light collimation correction device 12 is provided on the light-emitting side of the organic light-emitting diode display panel 13.

In any one of the above embodiments, the type of the light collimation correction device 12 is not limited. For example, the light collimation correction device 12 can be a brightness enhancement film, or a lens structure having a light collimation correction function, and so on.

Figure 5:
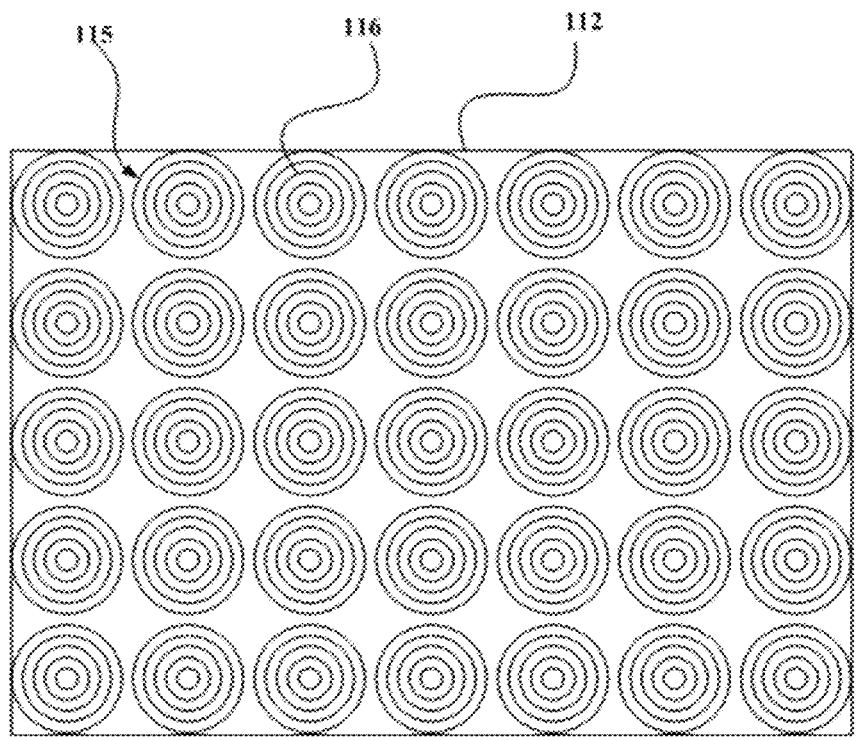
FIG. 5 is a schematic view of the second substrate of the liquid crystal lens panel according to a fifth embodiment of the present disclosure.

In an embodiment of the present disclosure, the liquid crystal lens panel 2 includes a first substrate, a second substrate opposite to the first substrate, and a liquid crystal layer between the first substrate and the second substrate. The first substrate or the second substrate is provided with a planar electrode, namely the above mentioned first electrode; as illustrated in FIG. 5, the second substrate 112 is provided with a plurality of electrode units 115 arranged in an array (namely the above mentioned second electrode), each of the electrode units 115 includes at least two ring-shaped electrodes 116 arranged in a radial manner; and the equivalent lens unit 20 is formed due to the effect that the electric field between the electrode units 115 and the planar electrode drives the liquid crystal layer. The ring-shaped electrodes arranged in a radial manner, as illustrated in FIG. 5, refer to the ring-shaped electrodes having a same center but are different sizes are arranged from the inside out and around the same center.

The planar electrode and the electrode unit 115 can be disposed at a same substrate, or can also be respectively disposed at two substrates. No matter which design is adopted, it is required that an electric field which drives the liquid crystal molecules in the liquid crystal layer to rotate is generated between the electrode unit 115 and the planar electrode. The electric field between the electrode unit 115 and the planar electrode drives the liquid crystal layer to rotate, so that the effect equivalent to a condenser lens can be generated, and thus the direction of the collimated light can be adjusted.

In the case that such a structural design is adopted, the position of the equivalent lens unit 20 of the liquid crystal lens panel 2 is unadjustable, while the focus of the equivalent lens unit 20 can be adjusted via adjusting the voltages of the ring-shaped electrodes 116 in the electrode unit 115.

Figure 6:
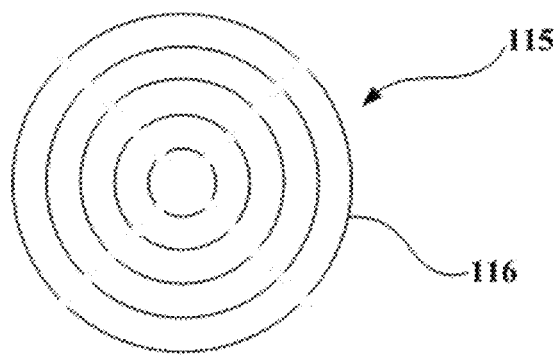
FIG. 6 is a schematic view of electrode units of the second substrate of the liquid crystal lens panel according to a sixth embodiment of the present disclosure.

As illustrated in FIG. 5, the ring-shaped electrodes 116 can be closed ring-shaped electrodes; or, as illustrated in FIG. 6, the ring-shaped electrodes 116 can also be discontinuous ring-shaped electrodes. The ring-shaped electrodes 116 illustrated in FIGS. 5 and 6 are circular ring-shaped electrodes. Furthermore, the ring-shaped electrodes can also adopt quadrate ring-shaped electrodes or triangular ring-shaped electrodes.

In the case that the ring-shaped electrodes are circular ring-shaped electrodes, the equivalent lens unit can be regarded as a unit equivalent to a spherical lens. In the case that the ring-shaped electrodes are quadrate ring-shaped electrodes or triangular ring-shaped electrodes, the equivalent lens unit can be regarded as a unit equivalent to a pyramid lens with corresponding number of edges.

Figure 7:
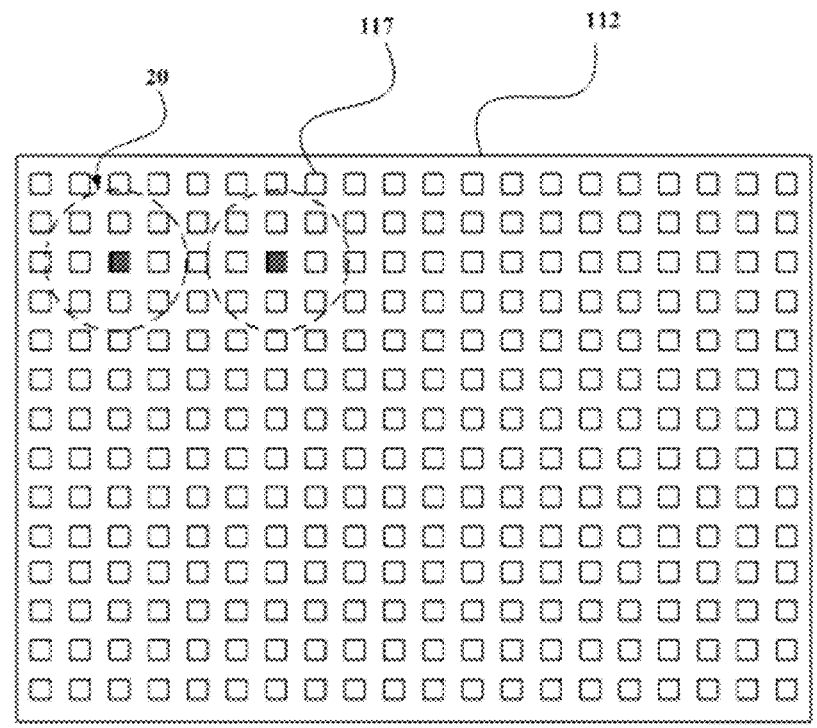
FIG. 7 is a schematic view of the second substrate of the liquid crystal lens panel according to a seventh embodiment of the present disclosure.

In another embodiment of the present disclosure, the liquid crystal lens panel 2 includes a first substrate, a second substrate opposite to the first substrate, and a liquid crystal layer between the first substrate and the second substrate. The first substrate or second substrate is provided with a planar electrode; as illustrated in FIG. 7, the second substrate 112 is provided with a plurality of electrode units, each of the electrode units includes a plurality of dot-matrix electrodes 117 arranged in an array; and the equivalent lens unit 20 is an equivalent lens unit with adjustable position, and the equivalent lens unit 20 is formed due to the effect that the liquid crystal layer is driven by the electric field between several dot-matrix electrodes 117, the positions of which are corresponding to the equivalent lens unit, and the planar electrode.

The planar electrode and the plurality of the electrode units can be disposed at a same substrate or can also be disposed respectively at two substrates. No matter which design is adopted, it is required that an electric field which drives the liquid crystal molecules in the liquid crystal layer to rotate is generated between each electrode unit 115 and the planar electrode. Each electrode unit includes a plurality of dot-matrix electrodes 117, the electric field between each dot-matrix electrode 117 in each electrode unit and the planar electrode drives the liquid crystal layer, so that the effect equivalent to a condenser lens can be generated, and thus the direction of the collimated light can be adjusted. It is to be noted that, besides the effect of focusing light, the liquid crystal lens can also generate other effect, as long as the direction of the light is changed.

In the case that such a structure design is adopted, the focus and position of the equivalent lens unit 20 of the liquid crystal lens panel 2 are adjustable. If the position of the equivalent lens unit 20 is set, by adjusting the voltages of the dot-matrix electrodes 117 at different positions, the focus of the equivalent lens unit 20 is adjusted. By adjusting the voltages of the dot-matrix electrodes 17 at different positions, the position of the equivalent lens unit 20 can even be adjusted.

The shapes of the dot-matrix electrodes 117 are not limited. For example, the dot-matrix electrodes 117 can be the quadrate dot-matrix electrodes as illustrated in FIG. 7, or circular dot-matrix electrodes, or triangular dot-matrix electrodes, and so on.

In the embodiments illustrated in FIGS. 5 and 7, the focuses of the equivalent lens units are adjustable. For example, the focuses of the equivalent lens units can be controlled by applying different values of voltages to electrodes at different positions, so that the display device presents different depth information to realize the holography display, namely the display device can serve as a holography display device.

Figure 8:
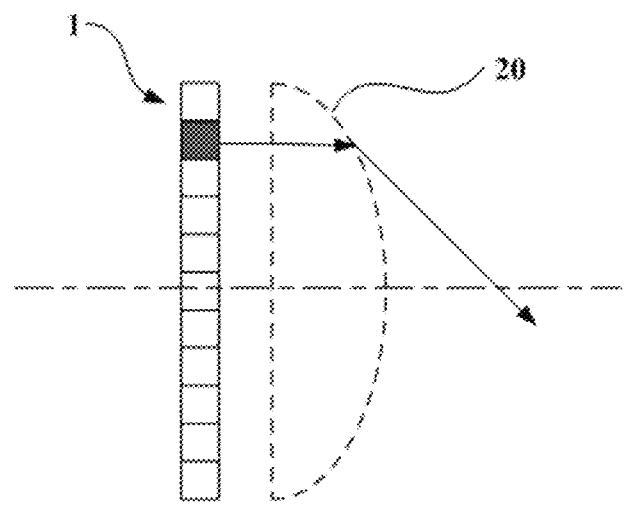
FIG. 8 is a schematic view illustrating that light is refracted by the equivalent lens unit in the seventh embodiment.

In an embodiment of the present disclosure, a plurality of pixel portions, positions of which are opposite to the equivalent lens unit 20, of the display module 1 is configured to be selectively turned off. In this way, not only the light energy is saved, but also the accurate control of the light path of the light emitted by the display device is facilitated, and thus the display quality is improved. For example, as illustrated in FIG. 8, in the case that the display device is a glasses-free 3D display device, it is selected that only one of the plurality of the pixels, the positions of which are corresponding to the equivalent lens units 20, in the display module 1 is turned on. In this way, the light path of the light after the action of the equivalent lens unit 20 is simple, and the emitting direction of the light can be controlled accurately, so that the light is orientated to the left-eye viewing region or the right-eye viewing region accurately, and thus the 3D display effect is improved. Furthermore, in the case that the position of a human eye is changed, it is possible to orient the light-emitting direction by adjusting the liquid crystal lens panel, so that the human eye still views a relatively good 3D display effect.

In summary, by adopting the technical solutions of the embodiments of the present disclosure, the light-emitting direction of a display device can be controlled according to the application situation of the display device, so as to reduce the unnecessary waste of light energy, and to improve the light utility rate. By using the solutions, the display device can also be used in situations such as an anti-peeping display, a glasses-free 3D display, and a holography display, and this greatly enriches the application range of the display device.

What are described above is related to the illustrative embodiments of the disclosure only and not limitative to the scope of the disclosure; the scopes of the disclosure are defined by the accompanying claims.

This application claims the benefit of Chinese Patent Application No. 201610012276.0, filed on Jan. 8, 2016, which is hereby entirely incorporated by reference as a part of the present application.

What is claimed is:

1. A display device, comprising a display module and a liquid crystal lens panel on a light-emitting side of the display module, wherein the liquid crystal lens panel comprises a first substrate, a second substrate opposite to the first substrate, and a liquid crystal layer between the first substrate and the second substrate, wherein the liquid crystal lens panel further comprises first electrode and a second electrode, the first electrode is provided on the first substrate or the second substrate, the second electrode is provided on the first substrate or the second substrate, the second electrode comprises a plurality of electrode units arranged in an array, and the first electrode and each of the plurality of the electrode units are configured to formed an electric field therebetween, so as to drive the liquid crystal layer to form an equivalent lens unit;

wherein the first electrode and the second electrode are provided on a same substrate;

wherein each of the electrode units comprises at least two ring-shaped electrodes arranged in a radial manner, the ring-shaped electrodes comprise discontinuous ring-shaped electrodes;

the equivalent lens unit of the liquid crystal lens panel is configured to adjust a direction of emergent light of the display module wherein the ring-shaped electrodes are evenly spaced in a radial direction.

2. The display device according to claim 1, wherein the display module comprises a backlight module, a liquid crystal panel and a light collimation correction device, wherein the liquid crystal panel is provided on the light-emitting side of the backlight module; and the light collimation correction device is provided between the backlight module and the liquid crystal panel, or the light collimation correction device is provided on a light-emitting side of the liquid crystal panel.

3. The display device according to claim 1, wherein the display module comprises an organic light-emitting diode display panel and a light collimation correction device, and the light collimation correction device is provided on a light-emitting side of the organic light-emitting diode display panel.

4. The display device according to claim 2, wherein the light collimation correction device comprises a brightness enhancement film.

5. The display device according to claim 1, wherein a plurality of pixel portions, positions of which are opposite to the equivalent lens unit, of the display module is configured to be selectively turned off.

6. The display device according to claim 1, wherein the display device comprises an anti-peeping display device, a glasses-free 3D display device, a holography display device or a partial light enhancement display device.

7. The display device according to claim 3, wherein the light collimation correction device comprises a brightness enhancement film.

8. The display device according to claim 2, wherein a plurality of pixel portions, positions of which are opposite to the equivalent lens unit, of the display module is configured to be selectively turned off.

9. The display device according to claim 2, wherein the display device comprises an anti-peeping display device, a glasses-free 3D display device, a holography display device or a partial light enhancement display device.

10. The display device according to claim 1, wherein the electrode units are configured to be applied different values of voltages at different positions to control a focuses of the equivalent lens unit.

* * * * *